(12) United States Patent
Davis

(10) Patent No.: US 6,671,900 B2
(45) Date of Patent: Jan. 6, 2004

(54) BED LEVELER/ADJUSTER

(75) Inventor: Waldon E. Davis, Chester, AR (US)

(73) Assignee: Waldon Davis, Chester, AR (US)

( * ) Notice: Subject to any disclaimer, the term of this patent is extended or adjusted under 35 U.S.C. 154(b) by 0 days.

(21) Appl. No.: 09/798,065

(22) Filed: Mar. 5, 2001

(65) Prior Publication Data

US 2001/0044959 A1 Nov. 29, 2001

Related U.S. Application Data

(60) Provisional application No. 60/187,775, filed on Mar. 8, 2000.

(51) Int. Cl.[7] .............................. B60P 3/38; A47C 17/64
(52) U.S. Cl. ................................................ 5/118; 5/615
(58) Field of Search ..................... 5/118, 615

(56) References Cited

U.S. PATENT DOCUMENTS

| | | | | |
|---|---|---|---|---|
| 3,191,196 A | * | 6/1965 | Holm .............................. | 5/618 |
| 3,632,076 A | * | 1/1972 | Rogers, Jr. ..................... | 248/636 |
| 3,760,436 A | * | 9/1973 | Zach et al. ................... | 108/136 |
| 3,921,951 A | * | 11/1975 | Blok ........................... | 248/591 |
| 4,144,601 A | * | 3/1979 | Anderson et al. ............. | 105/316 |
| 4,196,483 A | * | 4/1980 | Lefler et al. ................... | 5/103 |
| 4,309,783 A | * | 1/1982 | Cammack et al. ............. | 5/615 |
| 4,312,088 A | * | 1/1982 | Webb .............................. | 5/11 |
| 4,625,348 A | * | 12/1986 | Renggli et al. ................. | 5/614 |
| 4,669,139 A | * | 6/1987 | Richter, Jr. ..................... | 5/118 |
| 4,742,586 A | * | 5/1988 | Galumbeck .................... | 5/411 |
| 4,979,248 A | * | 12/1990 | Kelley ......................... | 248/585 |
| 5,141,201 A | * | 8/1992 | Mizuno et al. ............. | 248/550 |
| 5,218,728 A | * | 6/1993 | Lloyd et al. ................ | 248/562 |
| 5,829,077 A | * | 11/1998 | Neige ............................ | 5/616 |
| 6,263,527 B1 | * | 7/2001 | Ross et al. ............. | 296/190.02 |

* cited by examiner

Primary Examiner—Robert J. Sandy
Assistant Examiner—Katherine Mitchell

(57) ABSTRACT

The Bed Leveler/Adjuster, when mounted into the sleeping cavity of a tractor truck, is a lightweight, economical, compact in height bed frame assembly that will either level the head and foot ends of the sleeping mattress when needed, or allow three seperate vertically adjustable sections of the sleeping mattress to be operated by the user to recline in a combination of ways. The Bed Leveler/Adjuster is operated by the use of a control unit that is powered by regulated air pressure supplied by the tractor truck.

7 Claims, 4 Drawing Sheets

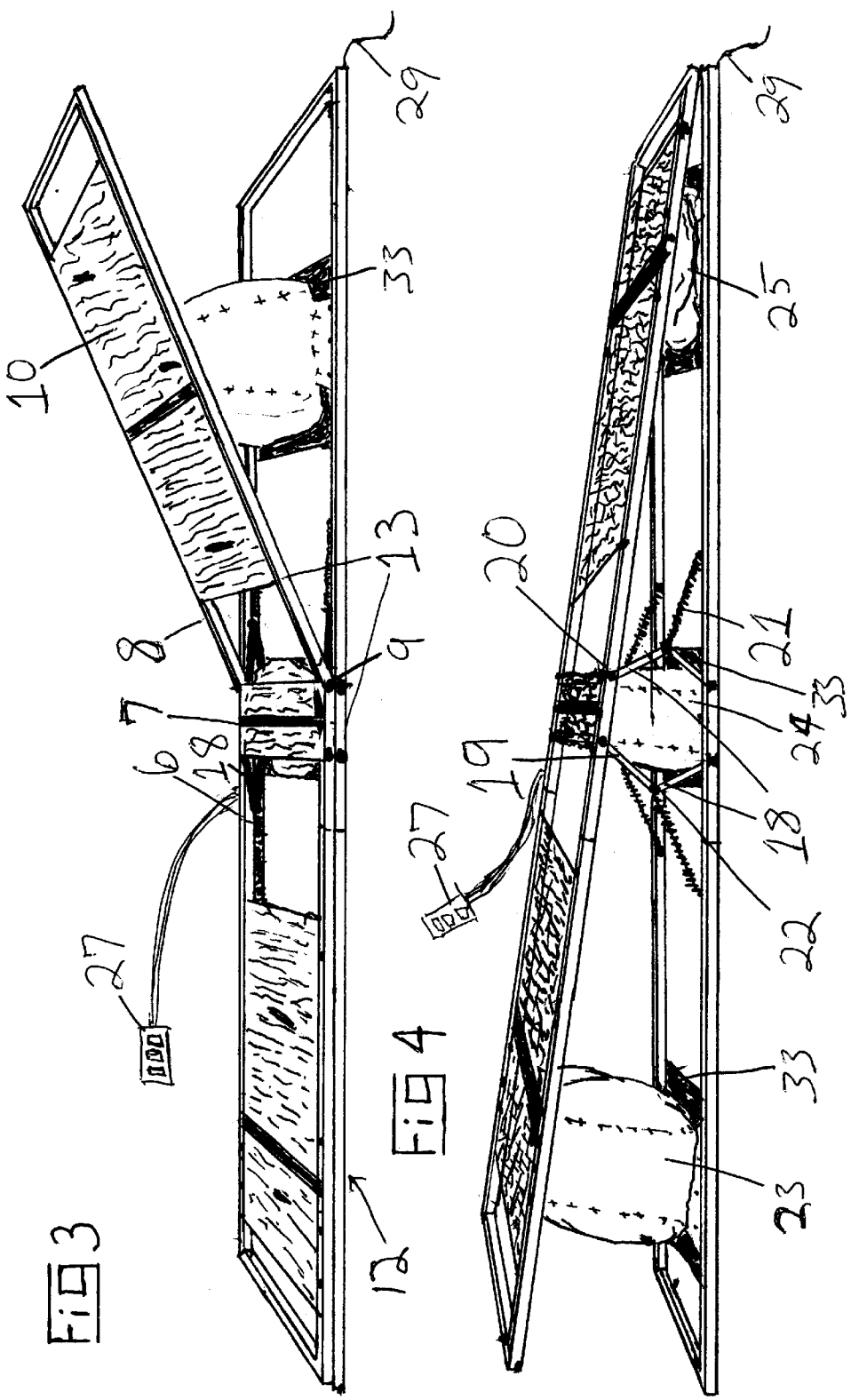

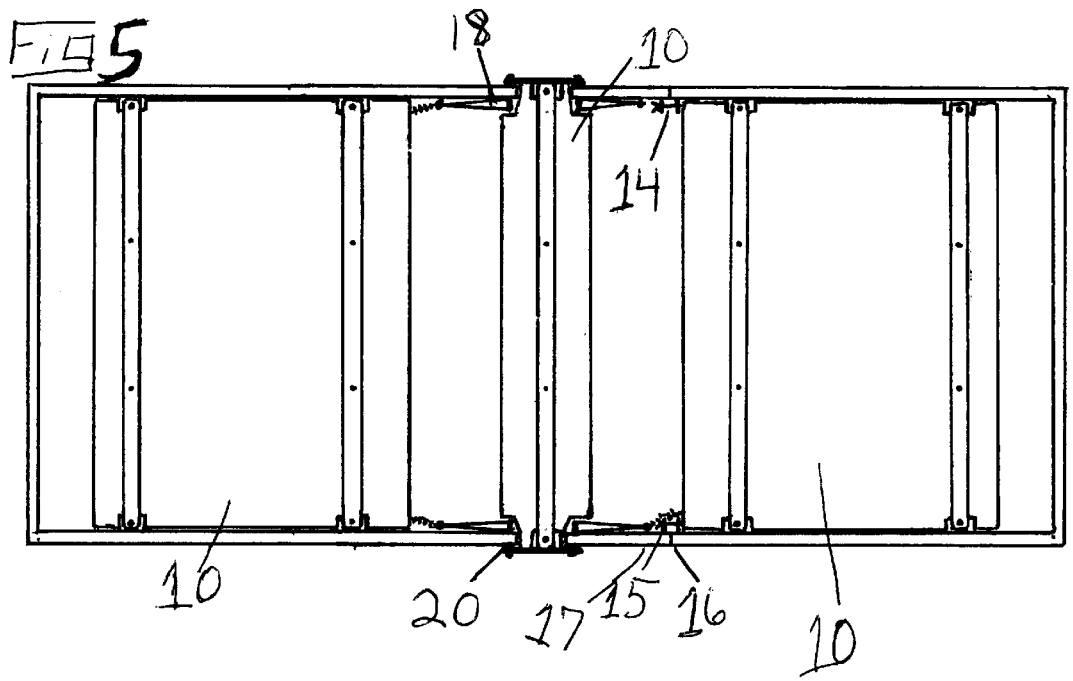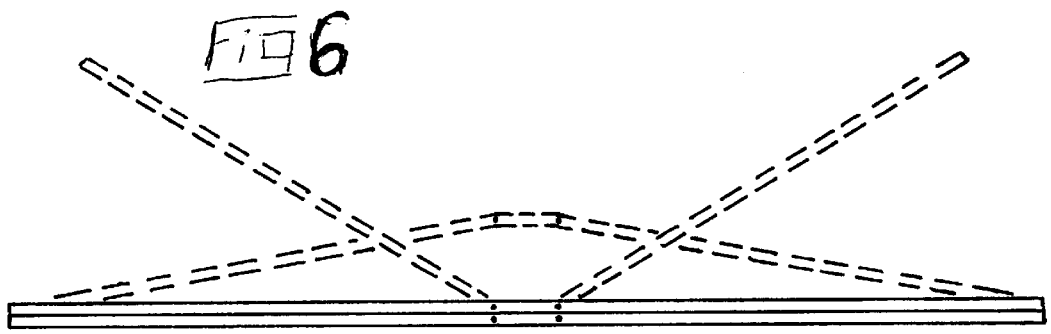

BED LEVELER/ADJUSTER

This application claims the benefit of provisional application ser. No. 60/187,775 filed Mar. 8, 2000.

FIELD OF INVENTION

Truck drivers with sleeper compartments mounted to their trucks often find that sleeping can be difficult and uncomfortable while they have no choice but to be parking their tractor trucks on un-even or sloped surfaces during their sleeptime. Sometimes, they find themselves leaning sideling in a parking lot or parked on the shoulder of a road with the head end of the sleeper bunk being on the downhill side of the slope. Instinctively, the truck drivers may not want to switch their head to the foot end of the bed (to avoid sleeping with their head downhill), because of possibly a dirty or stinky foot end of the bed.

The Bed Leveler/Adjuster will allow the ends of the bed mattress to be leveled up with one another as well as have various reclining positions. The Bed Leveler/Adjuster is lightweight, economical, and measures less than one and one half of an inch in height at the collapsed position.

BRIEF DESCRIPTION OF DRAWINGS

FIG. 3 Shows the Bed Leveler/Adjuster assembly in a close-up reclining position.

FIG. 4 Shows the bed unit in a leveling position.

FIG. 5 Illustrates a top view of the Bed Leveler/Adjuster.

FIG. 6 Illustrates three of the five optional positions of the bed leveler/adjuster.

FIG. 7 Illustrates the remaining two out of five optional positions of the Bed Leveler/Adjuster.

DESCRIPTION OF THE PREFERRED EMBODIMENT

Figure 1:
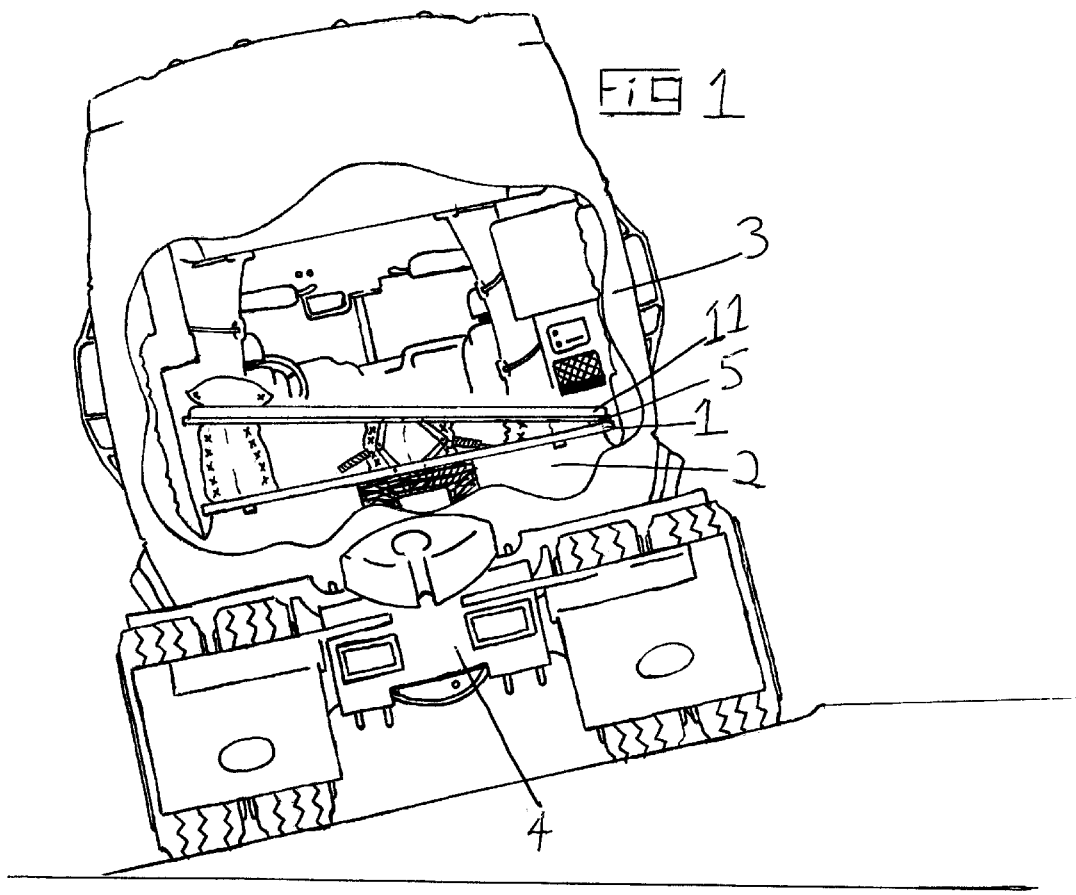
FIG. 1 Illustrates a tractor truck parked on a sideling slope. The sleeper bed is made level with the Bed Leveler/Adjuster.
Figure 2:
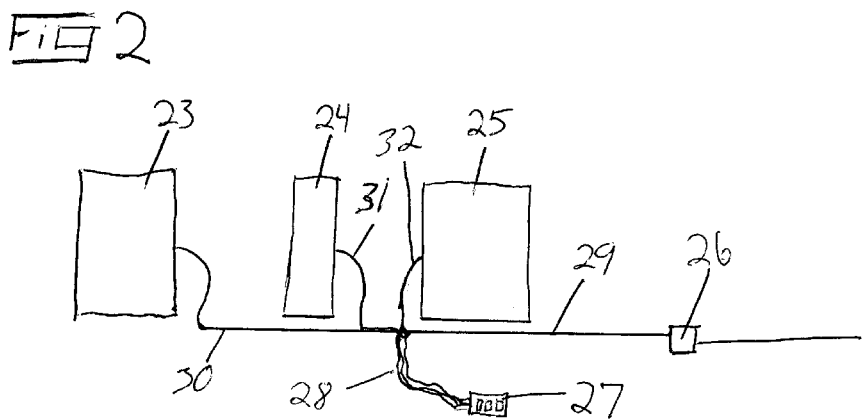
FIG. 2 Illustrates the air system of the Bed Leveler/Adjuster.
Figure 8:
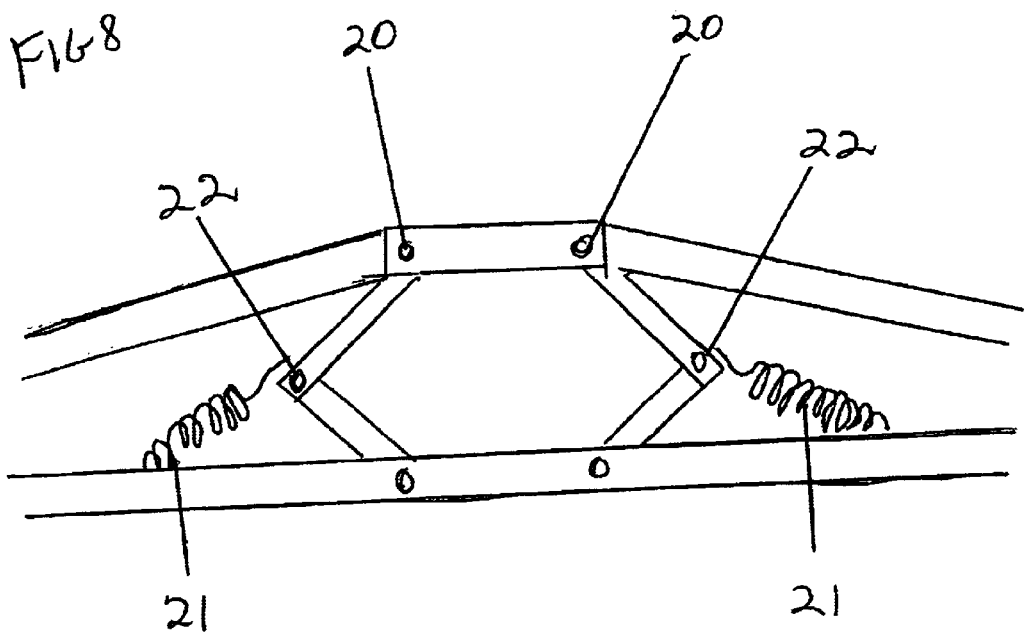
FIG. 8 Illustrates a closer view of the upper frame assembly pivoting points.
Figure 9:
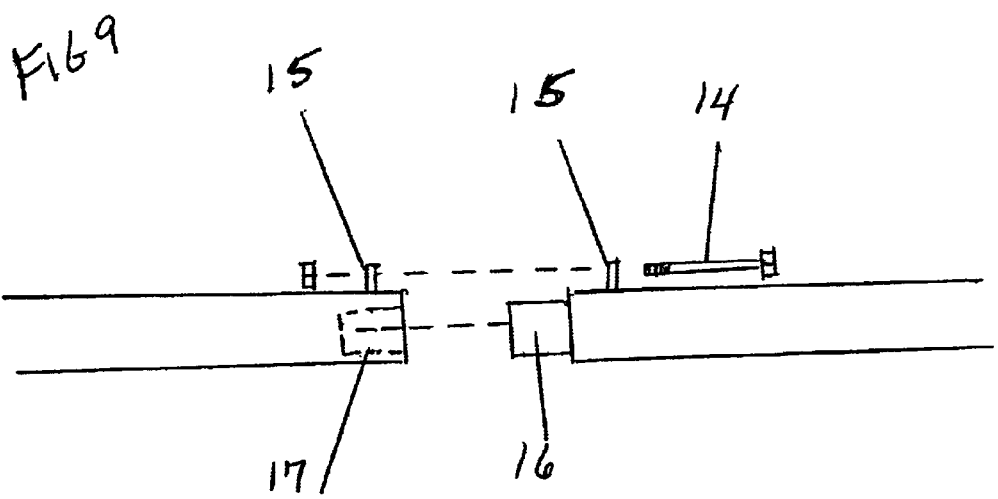
FIG. 9 Illustrates a more detailed view of the slide-apart union and its keeping features.

The rectangular stationary lower frame base 1 is anchored into sleeping cavity 2 of the sleeper compartment 3 of the tractor truck 4.

The rectangular upper frame assembly 5, assembled and lying flat against the lower base frame 1, being the same length, width, and height as the lower base frame 1 is actually three separate frame sections 6, 7, 8 that are bolted or pinned together to hinge the said upper frame assembly 5 at the two pivoting points nearer the center lengthwise, totaling four pivoting connections 20 in all. The pivoting actions allow three vertically adjustable areas 6, 7, 8 of the upper frame assembly 5.

Lightweight, strong, thin platforms are attached to all three sections 6, 7, 8 of the upper frame assembly 5 to serve as the mattress support: platforms 40, 50, 60 for the sleeping mattress 11 to lie directly upon, and further strengthen the structure of the upper frame assembly 5.

The upper frame assembly 5 and lower base frame 1 each have a portion of frame 12 on the same end of the bed assembly that detaches nearly half of the bed frame 12 from the larger portion 13 by removing retainer bolts 14 from eyelets 15 and sliding the fabricated pegged ends of the frames 16 from the mating slotted ends 17 of the adjacent frame section, which reduces the size of the bed frame assembly for maneuvering the unit in or out of small spaces for installation or de-installation. The lower frame base 1 is connected to the hinged upper frame 5 by four stabilizing arms 18 each of which consist of two slim brackets 19 similar in shape, bolted or pinned together, with one end of the stabilizing arm fastened to the lower frame base 1 and the other and of the stabilizing arm 18 being fastened to the upper frame pivoting point 20 directly above the lower frame connection. The tension spring 22 of the stabilizing arm 18 and the opposite end of the tension spring is fastened to the lower frame base 1.

The tension springs 21 keep unnecessary slack from being between the upper frame assembly 5 to minimize rocking and swaying when said upper frame assembly 5 is being supported by at least one of the airbags 23, 24, 25.

The airbags 23, 24, 25 are comprised of thin, flexible, airtight, bladders with strong, thin flexible liners fabricated to protect the thin bladder and to restrict and contain the air pressurized bladder. Air supply from the truck 4 goes through a regulator 26 and then to a control unit 27. By manually pressing a switch on the control unit 27 the air valve in the said control unit either sends air pressure to at least one of the air bags 23, 24, 25 and expands the bladder with the force needed to raise the corresponding upper frame section 6, 7, 13 to desired height or opens the air passage from any of the said air bags, allowing the air pressure to escape and the said airbag to deflate, causing the upper frame section 6, 7, 8 to lower with respect to the corresponding said airbag.

The control unit 27 is attached to a flexible lead 28 with at least one airline 29, 30, 31, 32 concealed inside, running from the bed frame to the control unit 27. The lead 28 contains at least one full-time air pressurized airline 29 coining from regulated air supply, and any of the three other air lines 30, 31, 32 each reserved for its own airbag. Using the truck's already available air supply, the air pressure is regulated and sent to the control unit 27 to be distributed to any of the three said airbags 23, 24, 25 within the bed frame assembly at the touch of the corresponding switch. The control unit has the function to inflate or deflate any or all of the airbags using the regulated air supply from the truck's air system. The airbags 23, 24, 25 are fastened to protective shields 33 that are fastened to the lower frame base 1 as well as the upper frame sections 6, 7, 8 to hold said airbags in place. The shields 33 protect the airbags from punctures or tears from above or below and also provide a smooth surface for the airbags to push against.

I claim:
1. A tractor truck comprising:
A sleeper compartment mounted to said truck containing a sleeping bed frame system that will level a sleeping mattress as well as recline in various positions with the system including:
A lower frame base anchored to a sleeping cavity of the sleeper compartment of said truck;
A pivoting triple-sectioned upper frame assembly with three vertically adjusting points;
Lifting devices to vertically adjust at least one mattress platform with regulated air pressure from a regulated air supply and be operated by a control unit;
Tensioned stabilizing arms connecting the lower frame base to the pivoting, triple-sectioned upper frame assembly;

A leveling and reclining bed frame system, including lifting devices, which when collapsed measures no more than one and one half of an inch in height;

A bed frame than can be dismantled to transport or store in compact spaces.

2. A tractor truck comprising a sleeping bed system as described in claim 1, wherein the able to be dismantled frame includes slide-apart unions held together with retaining bolts run through eyelets attached to frame sections.

3. A tractor truck comprising a sleeping bed system as described in claim 1, wherein pressing a switch on the control unit receives the regulated air supply from the said truck, and directs the air supply through at least one airline to power at least one airbag or allows the air pressure to escape from at least one airbag through at least one airline to said control unit where the air pressure is then exhausted.

4. A tractor truck comprising a sleeping bed system as described in claim 3, wherein at least one airbag consists of an airtight, flexible, thin bladder attached to at least one airline that is routed to said control unit.

5. A tractor truck comprising a sleeping bed system as described in claim 4, wherein said bladder of at least one airbag is contained and restricted by an outer protective, strong, thin material, which is sewn or fabricated to the shape needed for the airbag to appropriately support at least one upper frame section.

6. A tractor truck comprising a sleeping bed system as described in claim 1, wherein the stabilizing arms with pivoting points have tension springs attached to said pivoting points and also to lower frame base.

7. A tractor truck comprising a sleeping bed system as described in claim 1, wherein the mattress support frame is three separate frame sections, a head section, a buttock section, and a foot section, hinged at two points between the head and foot ends of the bed near center longitude to allow a head section, buttock section, and the foot section to each be vertically adjustable by the use of the control unit sending regulated air pressure to each respective individual airbag.

* * * * *